US011360687B2

(12) United States Patent
Tong et al.

(10) Patent No.: US 11,360,687 B2
(45) Date of Patent: Jun. 14, 2022

(54) METHOD OF PROCESSING A INPUT-OUTPUT REQUEST, AN ELECTRONIC DEVICE, AND A COMPUTER PROGRAM PRODUCT

(71) Applicant: EMC IP Holding Company LLC, Hopkinton, MA (US)

(72) Inventors: Renyuan Tong, Chengdu (CN); Juan Huang, Chengdu (CN); Yi Han Yang, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/030,797

(22) Filed: Sep. 24, 2020

(65) Prior Publication Data
US 2022/0035554 A1    Feb. 3, 2022

(30) Foreign Application Priority Data
Jul. 31, 2020  (CN) .......................... 202010757454.9

(51) Int. Cl.
*G06F 3/06* (2006.01)
*G06F 12/14* (2006.01)

(52) U.S. Cl.
CPC .......... *G06F 3/0649* (2013.01); *G06F 3/0611* (2013.01); *G06F 3/0653* (2013.01); *G06F 3/0659* (2013.01)

(58) Field of Classification Search
CPC .......... G06F 3/06–0689; G06F 3/0649; G06F 3/0611; G06F 3/0653; G06F 3/0659
See application file for complete search history.

(56) References Cited

U.S. PATENT DOCUMENTS

| | | | |
|---|---|---|---|
| 8,327,103 B1 | 12/2012 | Can et al. | |
| 8,782,324 B1 | 7/2014 | Chen et al. | |
| 9,594,514 B1 | 3/2017 | Bono et al. | |
| 9,619,169 B1* | 4/2017 | Throop | G06F 3/0689 |
| 9,965,201 B1 | 5/2018 | Bono et al. | |
| 10,552,056 B2 | 2/2020 | Marchenko et al. | |
| 2011/0283075 A1* | 11/2011 | Jess | G06F 3/0665 |
| | | | 711/162 |
| 2016/0188424 A1* | 6/2016 | Walls | G06F 11/2064 |
| | | | 714/6.3 |

* cited by examiner

*Primary Examiner* — Nicholas J Simonetti
(74) *Attorney, Agent, or Firm* — BainwoodHuang (57) ABSTRACT

Techniques involve: receiving an input/output request for data stored in a second storage means of a storage system; determining a use frequency of the data; moving the data from the second storage means into a first storage means in the storage system if it is determined that the use frequency is higher than a threshold frequency and the input/output request is a read request, an input/output speed of the first storage means being higher than that of the second storage means; and writing, if it is determined that the use frequency is higher than the threshold frequency and the input/output request is a write request that includes update data, the update data as the data into the first storage means. Accordingly, the storage performance can be improved without affecting the input/output traffic, which not only can reduce the operating cost, but also can improve user experience.

11 Claims, 4 Drawing Sheets

METHOD OF PROCESSING A INPUT-OUTPUT REQUEST, AN ELECTRONIC DEVICE, AND A COMPUTER PROGRAM PRODUCT

CROSS-REFERENCE TO RELATED APPLICATION

This application claims priority to Chinese Patent Application No. CN202010757454.9, on file at the China National Intellectual Property Administration (CNIPA), having a filing date of Jul. 31, 2020, and having "A METHOD OF PROCESSING A INPUT-OUTPUT REQUEST, AN ELECTRONIC DEVICE, AND A COMPUTER PROGRAM PRODUCT" as a title, the contents and teachings of which are herein incorporated by reference in their entirety.

TECHNICAL FIELD

Embodiments of the present disclosure generally relate to the field of data storage, and in particular, to a method for processing an input/output request, an electronic device, and a computer program product.

BACKGROUND

A data storage system may have a relocation function for stored data. The relocation function is used to move data stored in the storage system between storage means with different access speeds in the storage system according to the use frequency or temperature information of the data, wherein the access speed can also be called input/output speed. Generally, the cost of a storage means with a relatively high access speed is relatively high, such storage means including, for example, a flash memory. The cost of a storage means with a moderate access speed is moderate, such storage means including, for example, a serial attached SCSI (SAS) memory. The cost of a storage means with a relatively low access speed is relatively low, such storage means including, for example, a near line SAS (NL SAS) memory, which uses an SAS interface but of which the performance of disk body fails to reach the SAS standard. Therefore, it is possible to improve the access efficiency of the storage system by storing data having high use frequency in a storage means with a relatively high access speed. The relocation function may include, for example, a fully automated storage tiering for virtual pools (FAST VP) function, which is used to monitor the data access pattern in a storage pool composed of multiple storage means on the system, and make decisions to move data across multiple storage means in the storage pool, so as to maximize the performance of the storage pool and efficiently use the storage space in the storage pool. With the FAST VP function, the most frequently accessed data is automatically moved to a storage means with a greater speed, and the less accessed data is automatically moved to a storage means with a smaller speed.

However, the conventional relocation function has a low priority and is easily disabled due to the high utilization rate of any one of the storage means in the storage system, and it cannot cope with scenarios that require real-time processing of input/output requests.

SUMMARY OF THE INVENTION

Embodiments of the present disclosure provide a method for processing an input/output request, an electronic device, and a computer program product.

In a first aspect of the present disclosure, a method for processing an input/output request is provided. The method includes: receiving an input/output request for data stored in a second storage means (e.g., equipment, specialized circuitry, etc.) of a storage system; determining a use frequency of the data; moving the data from the second storage means into a first storage means (e.g., equipment, specialized circuitry, etc.) in the storage system if it is determined that the use frequency is higher than a threshold frequency and the input/output request is a read request, an input/output speed of the first storage means being higher than that of the second storage means; and writing, if it is determined that the use frequency is higher than the threshold frequency and the input/output request is a write request that includes update data, the update data as the data into the first storage means.

In a second aspect of the present disclosure, an electronic device is provided. The device includes: at least one processing unit; and at least one memory coupled to the at least one processing unit and storing instructions configured to be executed by the at least one processing unit, wherein the instructions, when being executed by the at least one processing unit, cause the device to perform actions including: receiving an input/output request for data stored in a second storage means of a storage system; determining a use frequency of the data; moving the data from the second storage means into a first storage means in the storage system if it is determined that the use frequency is higher than a threshold frequency and the input/output request is a read request, an input/output speed of the first storage means being higher than that of the second storage means; and writing, if it is determined that the use frequency is higher than the threshold frequency and the input/output request is a write request that includes update data, the update data as the data into the first storage means.

In a third aspect of the present disclosure, a computer program product is provided. The computer program product is tangibly stored on a non-transitory computer-readable medium and including machine-executable instructions, wherein the machine-executable instructions, when being executed, cause a machine to perform any of the steps of the method described according to the first aspect of the present disclosure.

The Summary section is provided to introduce the selection of concepts in a simplified form, which will be further described in the Detailed Description below. The Summary section is neither intended to identify key features or essential features of the embodiments of the present disclosure, nor intended to limit the scope of the embodiments of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same components.

In the accompanying drawings, the same or corresponding numerals represent the same or corresponding parts.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Hereinafter, preferred embodiments of the present disclosure will be described in more detail with reference to the accompanying drawings. Although the preferred embodiments of the present disclosure are shown in the accompanying drawings, it should be understood that the present disclosure can be implemented in various forms and should not be limited by the embodiments set forth herein. Rather, these embodiments are provided to make the present disclosure more thorough and complete and to fully convey the scope of the present disclosure to those skilled in the art.

As used herein, the term "include" and variations thereof mean open-ended inclusion, that is, "including but not limited to." Unless specifically stated, the term "or" means "and/or." The term "based on" means "based at least in part on." The terms "an example embodiment" and "an embodiment" mean "at least one example embodiment." The term "another embodiment" means "at least one additional embodiment." The terms "first," "second", and the like may refer to different or identical objects. Other explicit and implicit definitions may also be included below.

As described in the Background above, the conventional relocation function has a low priority and is easily disabled due to the high utilization rate of any one of the storage means in the storage system, and it cannot cope with scenarios that require real-time processing of input/output requests.

Specifically, since the conventional relocation function cannot be executed while an input/output operation is performed, it is highly possible that the conventional relocation function may only be performed very slowly, or even completely disabled, when the storage system needs to process many input/output operations or needs to process input/output operations frequently.

In addition, the conventional relocation function, when executed, needs to, for example, evaluate the use of the storage means, and will consider the use of all the storage means included in the storage system for the evaluation. For example, if most of the data in the storage system is stored in an SAS memory with a moderate access speed and a small part of the data is stored in a flash memory with a high access speed, for example, 70% of the data is stored in the SAS memory and 30% of the data is stored in the flash memory, when the storage system receives input/output requests for the data stored by the storage system, most of these requests will be located to the SAS memory, so the SAS memory will easily reach its peak performance. Since the conventional relocation function considers the use of all the storage means included in the storage system for evaluation, it will find that the SAS memory is about to reach its peak performance, and will choose to disable the relocation function even if there is a large amount of available storage space in the flash memory at this moment and it is far from reaching the peak performance, thus causing the storage system to be unable to perform the relocation function.

The inventor tested and analyzed the relocation function by taking a storage pool with specific numbers of flash memories, SAS memories, and NL SAS memories as an example. In this example test and analysis, the followings are used: 3 flash memories of which the total storage space is 5.7 TB, and the available storage space is 1.2 TB; 5 SAS memories of which the total storage space is 6.4 TB, and the available storage space is 2.6 TB; and 6 NL SAS memories of which the total storage space is 14.3 TB, and the available storage space is 14.3 TB. In the storage pool of this example test and analysis, 26% of the data related to the input/output requests is stored in the flash memories, and 74% is stored in the SAS memories. In this example test and analysis, the data used for test only occupies 400 GB, and there is 1.2 TB of available storage space in the flash memories. When the test starts, since 74% of the data related to the input/output requests is stored in the SAS memories, most of the input/output requests are located to the SAS memories. Therefore, when checking the statistics of performance, it can be found that each SAS memory has an Input/Output Operations per Second (IOPS) of about 400, and each flash memory has only an IOPS of about 30. When the test lasts for 20 hours, it can be found that this storage pool only has an IOPS of 1 k, but based on the storage means in the storage pool, the expected IOPS should be 70 k. Through further analysis, it can be found that due to the high amount of input/output operations that the SAS memories need to process, the relocation function has been disabled multiple times or even completely stopped.

It can be seen that the conventional relocation function has functional defects and cannot meet the high-quality requirements of users for data storage.

In order to at least partially solve the above problems and one or more of other potential problems, the embodiments of the present disclosure propose a method for processing an input/output request. With this method, the storage system can implement the relocation of data related to input/output requests in different storage means of the storage system while processing the input/output requests. For example, when the storage system is processing a data read request, if the read frequency of the data to be read is high, the storage system can move this data to a storage means with a relatively high access speed after completing the read request, so as to speed up subsequent reading of this data. In addition, when the storage system is processing a data write request that includes update data, if the frequency of writing this data is high, the storage system can directly write the update data into a storage means having a greater speed, in order to speed up subsequent data writing of this data.

Compared with the conventional relocation function, the above method can improve the storage performance of the storage system without affecting the input/output traffic.

Figure 1:
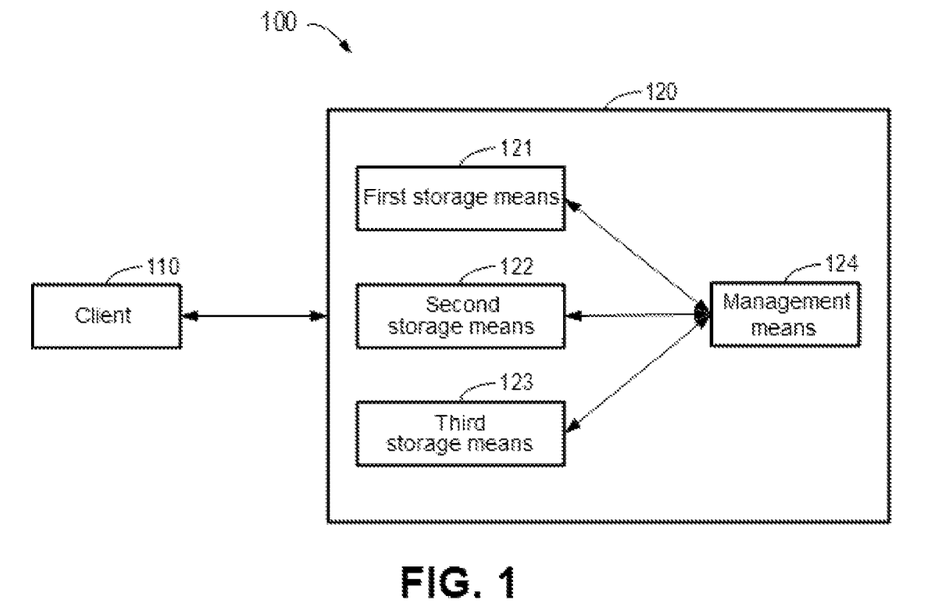
FIG. 1 shows a schematic diagram of data storage environment 100 in which a method for processing an input/output request in certain embodiments of the present disclosure can be implemented.

FIG. 1 shows a schematic diagram of data storage environment 100 in which a method for processing an input/output request in certain embodiments of the present disclosure can be implemented. According to an embodiment of the present disclosure, data storage environment 100 may be a cloud environment. As shown in FIG. 1, data storage environment 100 includes client 110 and storage system 120. Storage system 120 includes first storage means 121, second storage means 122, third storage means 123, and management means 124, wherein first storage means 121, second storage means 122, and third storage means 123 may constitute a storage pool for storage system 120.

It should be understood that data storage environment 100 is only an example rather than being restrictive, and it is extensible. It may include more clients and storage systems, and the storage system may include more first storage means, second storage means, third storage means, and management means, so that it can satisfy more users' need of simultaneously using the clients to interact with the storage systems to perform input/output operations.

According to an embodiment of the present disclosure, in storage system 120, first storage means 121 is a storage means with a relatively high access speed, such as a flash memory, and second storage means 122 is a storage means with a moderate access speed, such as an SAS (or similar disk drive) memory, and third storage means 123 is a storage means with a relatively slow access speed, such as an NL SAS (or similar disk drive) memory. First storage means 121, second storage means 122, and third storage means 123 are respectively used to store data related to input/output requests sent to storage system 120 by the user through client 110. Since, in storage system 120, first storage means 121 has the highest access speed, it is possible to improve the data access efficiency of storage system 120 by storing data of which the use frequency is high or hot data in first storage means 121.

According to an embodiment of the present disclosure, after the user sends, through client 110 to storage system 120, an input/output request for writing specific data for the first time, it can be considered that the specific data has a very low use frequency or belongs to cold data. Therefore, storage system 120 can perform input/output operations by management means 124 by storing the specific data in third storage means 123 with the slowest access speed.

After the user sends, through client 110 to storage system 120, a read request for reading specific data that has been stored in storage system 120 or a write request for updating this specific data, storage system 120 can increase, by management means 124 after performing the corresponding input/output operations, the use frequency data or temperature data recorded in the storage system with respect to the specific data, wherein the use frequency data may directly indicate the use frequency of the specific data, and the temperature information may indicate the hotness of the specific data, while the hotness may indicate the use frequency of the specific data. According to an embodiment of the present disclosure, the use frequency data or temperature information for the data stored in storage system 120 may be stored in a use frequency database or a temperature database in storage system 120.

When no input/output operations are performed and a preset condition is satisfied, the relocation function can be enabled to relocate the data stored in storage system 120 among first storage means 121, second storage means 122, and third storage means 123 according to the use frequency or temperature of the data. Therefore, in a normal state, third storage means 123 stores cold data with low use frequencies, while first storage means 121 and second storage means 122 store hot data with high use frequencies and different temperatures, wherein first storage means 121 stores data with higher use frequencies or higher temperatures.

According to an embodiment of the present disclosure, in order to achieve the greatest degree of efficiency improvement with the minimum cost, storage system 120 is mainly used to move, by management means 124, the hot data stored in second storage means 122 into first storage means 121 when a specific condition is satisfied, so that the storage performance of storage system 120 can be improved most efficiently.

According to an embodiment of the present disclosure, management means 124 in storage system 120 can be used to process input/output requests received from client 110, as well as moving data among first storage means 121, second storage means 122, and third storage means 123. In addition, in data storage environment 100 shown in FIG. 1, the interaction between client 110 and storage system 120 may be performed through a network.

Figure 2:
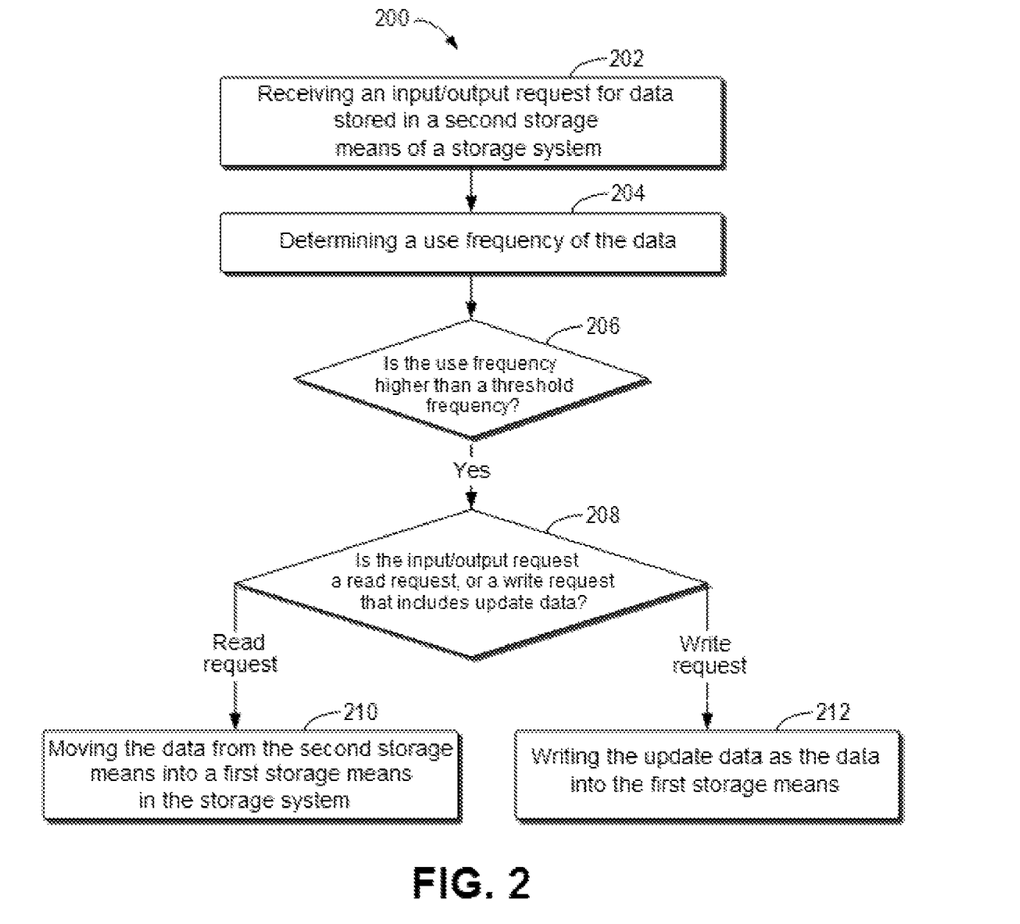
FIG. 2 shows a flowchart of method 200 for processing an input/output request according to an embodiment of the present disclosure.

FIG. 2 shows a flowchart of method 200 for processing an input/output request according to an embodiment of the present disclosure. Method 200 may be implemented by management means 124 in storage system 120 in data storage environment 100, or may be implemented by other appropriate devices. It should be understood that method 200 for processing an input/output request may further include additional steps not shown and/or may omit the shown steps, and the scope of the embodiments of the present disclosure is not limited in this respect.

In block 202, management means 124 receives an input/output request, which is sent by the user through client 110, for data stored in second storage means 122 of storage system 120.

According to an embodiment of the present disclosure, if the input/output request is targeted at cold data stored in third storage means 123 and having a low use frequency, it is unnecessary to move this data to other storage means, because it cannot be determined that this data will become hot data with a higher use frequency based on one input/output request for the cold data. If this data is moved to other storage means at this moment, frequent movement of data will be caused in storage system 120, which not only consumes the processing overhead required to move the data, but may also cause the storage space of first storage means 121 and second storage means 122 to rapidly decrease. In addition, if the input/output request is targeted at hot data stored in first storage means 121 which has the highest use frequency, since this data has already been stored in first storage means 121 with the highest access speed, it is also unnecessary to move this data into other storage means.

In block 204, management means 124 determines the use frequency of the data stored in second storage means 122 and targeted by the input/output request received in block 202.

According to an embodiment of the present disclosure, for the hot data stored in second storage means 122, management means 124 determines whether to move the hot data to first storage means 121 according to the use frequency of this hot data. Therefore, management means 124 first needs to determine the use frequency of this hot data.

According to another embodiment of the present disclosure, determining the use frequency of the data stored in second storage means 122 and targeted by the input/output request received in block 202 may include obtaining temperature information about this data by management means 124, wherein the temperature information indicates the hotness of the data, while the hotness indicates the use frequency of the data. According to an embodiment of the present disclosure, the use frequency data or temperature information for the data stored in storage system 120 may be stored in a use frequency database or a temperature database in storage system 120.

In block 206, management means 124 determines whether the use frequency, which is determined in block 204, of the data stored in second storage means 122 and targeted by the input/output request received in block 202 is higher than a threshold frequency.

According to an embodiment of the present disclosure, for the hot data stored in second storage means 122, only when the use frequency of this hot data is higher than a certain preset threshold frequency, will it be moved into first storage means 121. If the use frequency of this hot data is not higher than the preset threshold frequency, management means 124 may perform an input/output operation according to the received input/output request, increase the use frequency or hotness recorded for this hot data, and store the updated use frequency or hotness in the use frequency database or the temperature database in storage system 120.

Therefore, in block 206, when management means 124 determines that the use frequency of the data stored in second storage means 122 and targeted by the input/output request received in block 202 is higher than the threshold frequency, the process proceeds to block 208.

In block 208, management means 124 determines whether the input/output request received in block 202 is a read request or a write request that includes update data. According to an embodiment of the present disclosure, the read request is, for example, to read data stored in second storage means 122 without changing the data itself. The write request that includes update data is, for example, to write the data in the form of the update data, and after this write operation is performed, the data stored in second storage means 122 is updated.

In block 208, when management means 124 determines that the input/output request received in block 202 is a read request, the process proceeds to block 210; and when management means 124 determines that the input/output request received in block 202 is a write request that includes update data, the process proceeds to block 212.

In block 210, management means 124 performs an input/output operation corresponding to the input/output request received in block 202, that is, a read operation, and moves to first storage means 121 the data stored in second storage means 122 and targeted by this input/output request.

In block 212, management means 124 writes, based on the write request that includes the update data and that is received in block 202, the update data to first storage means 121 as the data stored in second storage means 122 and targeted by this write request. According to an embodiment of the present disclosure, after writing the update data into first storage means 121, management means 124 may cause, for example, by means of modifying the data index in storage system 120, subsequent input/output requests for the data stored in second storage means 122 and targeted by this write request to be located to the update data written into first storage means 121.

According to an embodiment of the present disclosure, the input/output speed of first storage means 121 is higher than that of second storage means 122. Therefore, after the corresponding operation in block 210 or block 212 is performed, input/output operations corresponding to the subsequent input/output requests for this data will be located to first storage means 121, so that the input/output operations based on this data can be performed faster, and thus the input/output efficiency of storage system 120 can be improved.

It should be pointed out that when method 200 shown in FIG. 2 is executed, contents related to the conventional relocation function may not need to be considered.

Figure 3:
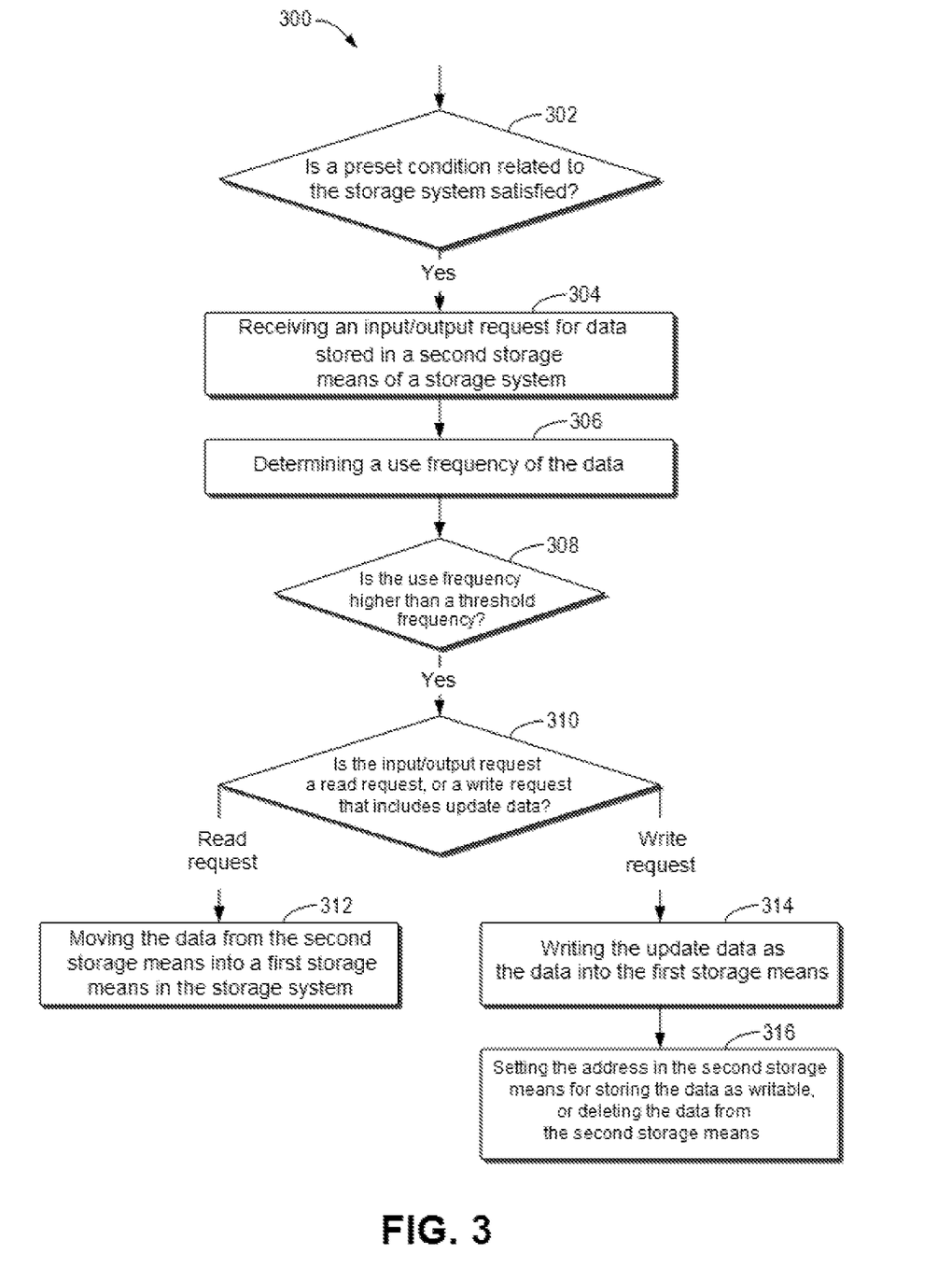
FIG. 3 shows a flowchart of method 300 for processing an input/output request according to an embodiment of the present disclosure.

FIG. 3 shows a flowchart of method 300 for processing an input/output request according to an embodiment of the present disclosure. Method 300 may also be implemented by management means 124 in storage system 120 in data storage environment 100, or may be implemented by other appropriate devices. It should be understood that method 300 may further include additional steps not shown and/or may omit the shown steps, and the scope of the present disclosure is not limited in this aspect. Method 300 for processing an input/output request is a specific implementation of method 200 for processing an input/output request.

It should be pointed out that when method 300 shown in FIG. 3 is executed, contents related to the conventional relocation function may be considered.

In block 302, management means 124 determines whether a preset condition related to storage system 120 is satisfied. According to an embodiment of the present disclosure, in at least one of the following cases, it may be determined that the preset condition is satisfied:

The relocation function for storage system 120 has been disabled. At this moment, since it is no longer possible to move data stored in storage system 120 between different storage means by using the relocation function according to the use frequency or hotness of the data, method 300 needs to be used to assist in movement of data.

The period for performing the relocation function in storage system 120 has started. According to an embodiment of the present disclosure, method 300 may be allowed to be used only in specific periods. Therefore, method 300 is allowed to be used only when it has just been determined that the period for performing the relocation function in storage system 120 has been started.

First storage means 121 and second storage means 122 have no malfunction. According to an embodiment of the present disclosure, when at least one of first storage means 121 and second storage means 122 has malfunction, the failure of data movement will be caused, so first storage means 121 and second storage means 122 having no malfunctioning is a precondition for the correct movement of data.

First storage means 121 and second storage means 122 are not in a data reconstruction period. According to an embodiment of the present disclosure, after at least one of first storage means 121 and second storage means 122 has malfunctioned and has been troubleshot, the data reconstruction period will be started. During the data reconstruction period, the data originally stored in first storage means 121 and second storage means 122 will be reconstructed. At this moment, moving the data may cause errors and failures.

The remaining life cycle of first storage means 121 is longer than a threshold life cycle. According to an embodiment of the present disclosure, when the life cycle of a storage means expires, the storage means needs to be replaced. Therefore, moving data to a storage means of which the life cycle is about to expire does not significantly improve the performance of storage system 120. In addition, if the life cycle of first storage means 121 expires during the process of data movement, it may further cause errors or failures during data movement.

The remaining storage space of first storage means 121 is greater than a threshold space. According to an embodiment of the present disclosure, in order to avoid overload of data input/output of first storage means 121, it can be configured such that moving data to first storage means 121 will be considered only when the remaining storage space of first storage means 121 is greater than the threshold space.

The IOPS of first storage means 121 is less than a threshold number of input/output operations. According to an embodiment of the present disclosure, in order to avoid overload of data input/output of first storage means 121, it can be configured such that moving data to first storage means 121 will be considered only when the IOPS of first storage means 121 is less than the threshold number of input/output operations.

The utilization rate of a central processing unit of storage system 120 is lower than a threshold utilization rate. According to an embodiment of the present disclosure, in order to avoid overload of processing of storage system 120 due to data movement, it can be configured such that moving data to first storage means 121 will be considered only when the utilization rate of the central processing unit of storage system 120 is lower than the threshold utilization rate.

The total remaining storage space of storage system 120 is greater than a threshold total remaining storage space. According to an embodiment of the present disclosure, when the total remaining storage space in storage system 120 is too small, moving data may cause a reduction in the data input/output performance of storage system 120. Therefore, it can be configured such that moving data to first storage means 121 will be considered only when the total remaining storage space of storage system 120 is greater than the threshold total remaining storage space.

According to some embodiments of the present disclosure, management means 124 may determine, when all the above situations occur, that the preset condition related to storage system 120 is satisfied. According to some other embodiments of the present disclosure, management means 124 may determine, when preselected situations in the above situations occur, that the preset condition related to storage system 120 is satisfied.

In block 302, when management means 124 determines that the preset condition related to storage system 120 is satisfied, the process proceeds to block 304.

In block 304, management means 124 receives an input/output request, which is sent by the user through client 110, for data stored in second storage means 122 of storage system 120. The specific content of this step is the same as that of the step recorded in block 202, and will not be repeated here.

In block 306, management means 124 determines the use frequency of the data stored in second storage means 122 and targeted by the input/output request received in block 304. The specific content of this step is the same as that of the step recorded in block 204, and will not be repeated here.

In block 308, management means 124 determines whether the use frequency, which is determined in block 306, of the data stored in second storage means 122 and targeted by the input/output request received in block 304 is higher than a threshold frequency. In block 308, when management means 124 determines that the use frequency of the data stored in second storage means 122 and targeted by the input/output request received in block 304 is higher than the threshold frequency, the process proceeds to block 310. The specific content of this step is the same as that of the step recorded in block 206, and will not be repeated here.

In block 310, management means 124 determines whether the input/output request received in block 304 is a read request or a write request that includes update data. When management means 124 determines that the input/output request received in block 304 is a read request, the process proceeds to block 312; and when management means 124 determines that the input/output request received in block 304 is a write request that includes update data, the process proceeds to block 314. The specific content of this step is the same as that of the step recorded in block 208, and will not be repeated here.

In block 312, management means 124 performs an input/output operation corresponding to the input/output request received in block 304, that is, a read operation, and moves to first storage means 121 the data stored in second storage means 122 and targeted by this input/output request. The specific content of this step is the same as that of the step recorded in block 210, and will not be repeated here.

In block 314, management means 124 writes, based on the write request that includes the update data and that is received in block 304, the update data to first storage means 121 as the data stored in second storage means 122 and targeted by this write request. The specific content of this step is the same as that of the step recorded in block 212, and will not be repeated here.

In block 316, management means 124 sets the address in second storage means 122 for storing the data targeted by this write request as writable, or deletes the data from second storage means 122. According to an embodiment of the present disclosure, although the subsequent input/output requests for the data stored in second storage means 122 and targeted by this write request can be caused, for example, by means of modifying the data index in storage system 120, to be located to the update data written into first storage means 121, for reasons such as reducing redundant data, the storage space in the original second storage means 122 for storing the data targeted by this write request can be used for the writing of other data, which can be realized by setting the address of the data to be writable or by deleting the data.

Contents related to data storage environment 100 in which the methods for processing an input/output request in certain embodiments of the present disclosure can be implemented, method 200 for processing an input/output request according to the embodiments of the present disclosure, and method 300 for processing an input/output request according to the embodiments of the present disclosure have been described above with reference to FIGS. 1 to 3. It should be understood that the above description is to better demonstrate the content recorded in the embodiments of the present disclosure, and is not intended to limit the present disclosure in any way.

It should be understood that the number of various elements and the magnitudes of physical quantities used in the embodiments of the present disclosure and the drawings are only examples, and are not intended to limit the protection scope of the embodiments of the present disclosure. The above-mentioned number and magnitudes can be arbitrarily set according to needs without affecting the normal implementation of the embodiments of the present disclosure.

Through the above description with reference to FIGS. 1 to 3, the technical solutions according to the embodiments of the present disclosure have many advantages over the conventional solution. For example, with the technical solutions of the present disclosure, the storage performance of the storage system can be improved without affecting the customer's input/output traffic, which not only can reduce the operating cost of the storage system, but also can improve the user experience of users of the storage system.

Figure 4:
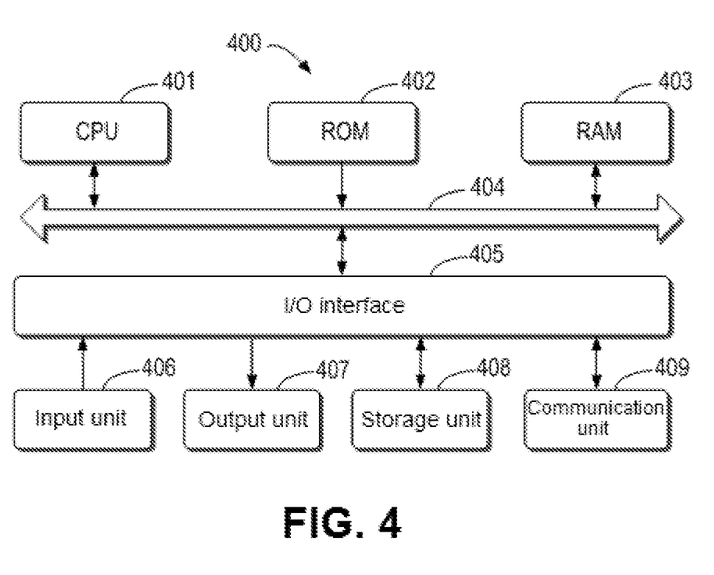
FIG. 4 shows a schematic block diagram of example device 400 that can be used to implement embodiments of the present disclosure.

FIG. 4 shows a schematic block diagram of example device 400 that can be used to implement the embodiments of the present disclosure. According to an embodiment of the present disclosure, management means 124 shown in FIG. 1 may be implemented as example device 400. As shown in the figure, device 400 includes central processing unit (CPU) 401 that may perform various appropriate actions and processing according to computer program instructions stored in read-only memory (ROM) 402 or computer program instructions loaded from storage unit 408 to random access memory (RAM) 403. In RAM 403, various programs and data required for the operation of device 400 may also be stored. CPU 401, ROM 402, and RAM 403 are connected to each other through bus 404. Input/output (I/O) interface 405 is also connected to bus 404.

A plurality of components in device 400 are connected to I/O interface 405, including: input unit 406, such as a keyboard and a mouse; output unit 407, such as various types of displays and speakers; storage unit 408, such as a magnetic disk and an optical disc; and communication unit 409, such as a network card, a modem, and a wireless communication transceiver. Communication unit 409 allows device 400 to exchange information/data with other devices over a computer network such as the Internet and/or various telecommunication networks.

The various processes and processing described above, such as methods 200 and 300, may be performed by processing unit 401. For example, in some embodiments, methods 200 and 300 may be implemented as a computer software program that is tangibly included in a machine-readable medium such as storage unit 408. In some embodiments, some or all of the computer program may be loaded and/or installed onto device 400 through ROM 402 and/or communication unit 409. When the computer program is loaded into RAM 403 and executed by CPU 401, one or more actions of methods 200 and 300 described above may be implemented.

The embodiments of the present disclosure may relate to a method, a device, a system, and/or a computer program product. The computer program product may include a computer-readable storage medium on which computer-readable program instructions for performing various aspects of the embodiments of the present disclosure are loaded.

The computer-readable storage medium may be a tangible device capable of retaining and storing instructions used by an instruction-executing device. For example, the computer-readable storage medium may be, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions stored thereon, and any suitable combination thereof. The computer-readable storage medium used here is not construed as transient signals themselves, such as radio waves or other freely propagating electromagnetic waves, electromagnetic waves propagating through waveguides or other transmission media (for example, optical pulses through fiber-optic cables), or electrical signals transmitted through electrical wires.

The computer-readable program instructions described here can be downloaded from the computer-readable storage medium to various computing/processing devices, or downloaded to an external computer or an external storage device over a network such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the embodiments of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages such as Smalltalk and C++ and conventional procedural programming languages such as "C" language or similar programming languages. The computer-readable program instructions can be executed entirely on a user computer, executed partly on a user computer, executed as a separate software package, executed partly on a user computer and partly on a remote computer, or executed entirely on a remote computer or a server. In a case where a remote computer is involved, the remote computer can be connected to a user computer through any kind of networks, including a local area network (LAN) or a wide area network (WAN), or can be connected to an external computer (e.g., connected through the Internet using an Internet service provider). In some embodiments, an electronic circuit, such as a programmable logic circuit, a field programmable gate array (FPGA), or a programmable logic array (PLA), can be customized by utilizing status information of the computer-readable program instructions. The electronic circuit may execute the computer-readable program instructions to implement various aspects of the embodiments of the present disclosure.

Various aspects of the embodiments of the present disclosure are described here with reference to the flowcharts and/or block diagrams of the methods, the devices/systems, and the computer program products according to the embodiments of the present disclosure. It should be understood that each block in the flowcharts and/or block diagrams and a combination of blocks in the flowcharts and/or block diagrams may be implemented by computer-readable program instructions.

These computer-readable program instructions may be provided to a processing unit of a general purpose computer, a special purpose computer, or other programmable data processing apparatuses to produce a machine, such that the instructions, when executed by the processing unit of the computer or other programmable data processing apparatuses, generate an apparatus for implementing the functions/actions specified in one or more blocks in the flowcharts and/or block diagrams. These computer-readable program instructions may also be stored in a computer-readable storage medium, to cause a computer, a programmable data processing apparatus, and/or other devices to work in a specific manner, such that the computer-readable medium storing the instructions includes an article of manufacture that contains instructions for implementing various aspects of the functions/actions specified in one or more blocks in the flowcharts and/or block diagrams.

The computer-readable program instructions may also be loaded onto a computer, other programmable data processing apparatuses, or other devices, so that a series of operating steps are performed on the computer, other programmable data processing apparatuses, or other devices to produce a computer-implemented process, so that the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functionalities, and operations of possible implementations of the system, the method, and the computer program product according to a plurality of embodiments of the present disclosure. In this regard, each block in the flowcharts or block diagrams may represent a module, a program segment, or part of an instruction, wherein the module, program segment, or part of an instruction include one or more executable instructions for implementing specified logical functions. In some alternative implementations, the functions marked in the blocks may also occur in an order different from that marked in the accompanying drawings. For example, two successive blocks may actually be performed basically in parallel, or they may be performed in an opposite order sometimes, depending on the functions involved. It should be further noted that each block in the block diagrams and/or flowcharts as well as a combination of blocks in the block diagrams and/or flowcharts may be implemented by using a dedicated hardware-based system for executing specified functions or actions or by a combination of dedicated hardware and computer instructions.

The embodiments of the present disclosure have been described above. The above description is illustrative, rather than exhaustive, and is not limited to the disclosed embodiments. Numerous modifications and alterations are apparent to those of ordinary skill in the art without departing from the scope and spirit of the illustrated various embodiments. The selection of terms as used herein is intended to best explain the principles and practical applications of the various embodiments or technical improvements to technologies on the market, or to enable other persons of ordinary skill in the art to understand the embodiments disclosed herein.

The invention claimed is:

1. A method for processing an input/output request, including:
   receiving an input/output request for data stored in a second storage means of a storage system;
   determining a use frequency of the data;
   determining whether a preset condition is satisfied, wherein the preset condition is determined to be satisfied when a relocation function for the storage system has been disabled, wherein the relocation function is used to move the data stored in the storage system between different storage means according to the use frequency of the data;
   in response to the preset condition being satisfied, moving the data from the second storage means into a first storage means in the storage system if it is determined that the use frequency is higher than a threshold frequency and the input/output request is a read request, an input/output speed of the first storage means being higher than that of the second storage means; and
   writing, if it is determined that the use frequency is higher than the threshold frequency and the input/output request is a write request that includes update data, the update data as the data into the first storage means.

2. The method according to claim 1, wherein writing the update data into the first storage means includes:
   writing the update data into the first storage means if it is determined that a preset condition related to the storage system is satisfied.

3. The method according to claim 2, wherein the preset condition is determined to be satisfied if at least one of the following cases is additionally satisfied:
   a period for executing the relocation function in the storage system has been started;
   the first storage means and the second storage means have no malfunction;
   the first storage means and the second storage means are not in a data reconstruction period;
   the remaining life cycle of the first storage means is longer than a threshold life cycle;
   the remaining storage space of the first storage means is greater than a threshold space;
   the Input/Output Operations per Second of the first storage means is less than a threshold number of input/output operations;
   the utilization rate of a central processing unit of the storage system is lower than a threshold utilization rate; and
   the total remaining storage space of the storage system is greater than a threshold total remaining storage space.

4. The method according to claim 1, wherein determining the use frequency of the data includes:
   obtaining temperature information about the data, wherein the temperature information indicates hotness of the data, and the hotness indicates the use frequency.

5. The method according to claim 1, further including:
   if it is determined that the use frequency of the data is higher than the threshold frequency and the input/output request is the write request that includes the update data,
   setting the address in the second storage means for storing the data to be writable; or
   deleting the data from the second storage means.

6. An electronic device, including:
   at least one processing unit; and
   at least one memory coupled to the at least one processing unit and storing instructions configured to be executed by the at least one processing unit, wherein the instructions, when being executed by the at least one processing unit, cause the device to perform actions including:
   receiving an input/output request for data stored in a second storage means of a storage system;
   determining a use frequency of the data;
   determining whether a preset condition is satisfied, wherein the preset condition is determined to be satisfied when a relocation function for the storage system has been disabled, wherein the relocation function is used to move the data stored in the storage system between different storage means according to the use frequency of the data;
   in response to the preset condition being satisfied, moving the data from the second storage means into a first storage means in the storage system if it is determined that the use frequency is higher than a threshold frequency and the input/output request is a read request, an input/output speed of the first storage means being higher than that of the second storage means; and writing, if it is determined that the use frequency is higher than the threshold frequency and the input/output request is a write request that includes update data, the update data as the data into the first storage means.

7. The device according to claim 6, wherein writing the update data into the first storage means includes:

writing the update data into the first storage means if it is determined that a preset condition related to the storage system is satisfied.

8. The device according to claim 7, wherein the preset condition is determined to be satisfied if at least one of the following cases is additionally satisfied:

a period for executing the relocation function in the storage system has been started;

the first storage means and the second storage means have no malfunction;

the first storage means and the second storage means are not in a data reconstruction period;

the remaining life cycle of the first storage means is longer than a threshold life cycle;

the remaining storage space of the first storage means is greater than a threshold space;

the Input/Output Operations per Second of the first storage means is less than a threshold number of input/output operations;

the utilization rate of a central processing unit of the storage system is lower than a threshold utilization rate; and the total remaining storage space of the storage system is greater than a threshold total remaining storage space.

9. The device according to claim 6, wherein determining the use frequency of the data includes:

obtaining temperature information about the data, wherein the temperature information indicates hotness of the data, and the hotness indicates the use frequency.

10. The device according to claim 6, wherein the actions further include:

if it is determined that the use frequency of the data is higher than the threshold frequency and the input/output request is the write request that includes the update data, setting the address in the second storage means for storing the data to be writable; or deleting the data from the second storage means.

11. A computer program product having a non-transitory computer readable medium which stores a set of instructions to process an input/output request; the set of instructions, when carried out by computerized circuitry, causing the computerized circuitry to perform a method of:

receiving an input/output request for data stored in a second storage means of a storage system;

determining a use frequency of the data;

determining whether a preset condition is satisfied, wherein the preset condition is determined to be satisfied when a relocation function for the storage system has been disabled, wherein the relocation function is used to move the data stored in the storage system between different storage means according to the use frequency of the data;

in response to the preset condition being satisfied, moving the data from the second storage means into a first storage means in the storage system if it is determined that the use frequency is higher than a threshold frequency and the input/output request is a read request, an input/output speed of the first storage means being higher than that of the second storage means; and writing, if it is determined that the use frequency is higher than the threshold frequency and the input/output request is a write request that includes update data, the update data as the data into the first storage means.

* * * * *